US00RE33810E

United States Patent [19]

Strieter

[11] E Patent Number: Re. 33,810

[45] Reissued Date of Patent: Feb. 4, 1992

[54] PORTABLE ISOLATION ENCLOSURE FOR USE IN CLEANING CONTAMINATED ENVIRONMENTS

[76] Inventor: Jerome F. Strieter, 12500 Peachstone Dr., Silver Spring, Md. 20904

[21] Appl. No.: 571,141

[22] Filed: Aug. 23, 1990

Related U.S. Patent Documents

Reissue of:

[64] Patent No.: 4,765,352
Issued: Aug. 23, 1988
Appl. No.: 75,827
Filed: Jul. 17, 1987

[51] Int. Cl.[5] ..... B08B 7/04

[52] U.S. Cl. ..... 134/99; 15/301; 52/63; 55/97; 55/385.2; 55/DIG. 29; 134/104.4; 134/172; 135/900; 454/63

[58] Field of Search ..... 134/99, 104.4, 172, 134/201, 21, 22.1, 25.4; 15/301, 345; 98/115.1, 115.4; 312/1, 3; 55/97, 385.2, DIG. 29; 52/27, 63; 135/106, 900

[56] References Cited

U.S. PATENT DOCUMENTS 4,624,690 11/1986 Byrnes ..... 55/DIG. 29
4,682,448 7/1987 Healey ..... 52/63
4,774,974 10/1988 Teter ..... 134/22.1 X

OTHER PUBLICATIONS

Nilfisk Brochure NIL-4002, Nov. 1986.

*Primary Examiner*—Philip R. Coe
*Attorney, Agent, or Firm*—Edward S. Irons

[57] ABSTRACT

A sealed portable isolation enclosure for use in removing asbestos material from ceiling or other elevated asbestos-containing structures including a booth and an adjustable ceiling-contacting plenum for accommodating ceiling of various heights. Disposed between the booth and the plenum is a flexible transparent film for enclosing and sealing the spaced formed therebetween regardless of the elevation of the plenum relative to the booth. The enclosure is equipped with EPA approved vacuum and ventilation systems for filtering and ventilating the contamainated air therein. A disposable bag-trap door system is provided for the disposal of the asbestos-containing materials. In addition, the enclosure may also include a shower system within the enclosure.

34 Claims, 2 Drawing Sheets

PORTABLE ISOLATION ENCLOSURE FOR USE IN CLEANING CONTAMINATED ENVIRONMENTS

Matter enclosed in heavy brackets [ ] appears in the original patent but forms no part of this reissue specification; matter printed in italics indicates the additions made by reissue.

FIELD OF THE INVENTION

The present invention relates to sealed portable isolation enclosures for use in cleaning contaminated environments, more specifically sealed portable isolation enclosures particularly suited for the safe removal of asbestos ceiling tile or other asbestos-containing elevated structures.

BACKGROUND OF THE INVENTION

Various types of environment work enclosures are known for isolating dangerous environments or the like from ambient environments, or vice versa. Conventional isolation enclosures are frequently employed in hospitals for the handling of human patients under controlled microbiological conditions, and in laboratories for providing germ-free environments, or conversely for isolating dangerous microorganisms in a restricted local. These isolators are adapted to isolate germs from entering the ambient environment, or vice versa, e.g. to prevent germs of the ambient environment from entering the isolated environment. For example, U.S. Pat. No. 3,051,164 and U.S. Pat. No. 4,335,712, both of Trexler, disclose such isolation enclosure systems specifically suited for hospital and laboratory use. The worker accesses the interior of the isolator by means of inwardly projecting integral gloves. Such U.S. Pat. No. 4,335,712 shows a portable wheeled isolator which facilitates the movement of a patient, positioned within the isolator, about a hospital.

Other isolation enclosures have been provided to protect workers from other types of hazardous environments by isolating the worker from the environment by only permitting the arms and hands of the worker to penetrate into the hazardous zone. Thus, as in the Trexler patents discussed above, the worker is outside the isolated zone and uses flexible arm and hand gloves which penetrate the rigid walls of the enclosure and at the same time provide a protective barrier. For example, U.S. Pat. No. 4,108,509 to Piet et al; U.S. Pat. No. 4,505,190 to Fink et al and U.S. Pat. No. 4,626,291 to Natale all disclose portable protective isolation enclosures which permit the arms and hands of a worker access to the interior of the enclosure. The patents to Fink et al and Natale both show protective enclosures which are suited for surrounding a contaminated area and isolating it from the ambient environment.

The Natale patent is particularly directed to a portable protective enclosure adapted for the removal of asbestos insulation from asbestos covered pipes and valves. While this device may operate to overcome the polluting of the surrounding environment, such device has no facility for cleaning large areas, nor has it the capability of providing an isolated environment during removal of asbestos or the like from ceilings.

Isolation enclosures have also been utilized to furnish workers with protection by isolating the ambient environment from a work environment which poses some dangers to the ambient environment and possibly the worker as well. These generally include a facility for protecting the worker from the contaminated material in the isolation enclosure while the worker is within the enclosure itself. Generally, these isolated enclosures serve to primarily protect the surrounding environments from the materials being used or during the disposal thereof; in other words the enclosure confines the potentially dangerous materials to a specific predetermined area. Preferably the isolated workplaces or enclosures should be large enough to accommodate at least one worker therein, so that he can carry out the desired work function.

For example, U.S. Pat. No. 3,657,991 to Oberg and U.S. Pat. No. 4,297,940 to Hainline both show isolated workplaces which are large enough to accommodate at least one worker therewithin. Both of these patents show protective enclosures which also include ventilation and filtering systems primarily to protect the worker from noxious fumes and the like, and aids in cleaning of the air reintroduced to the ambient atmosphere. However, neither of these patents disclose portable protective enclosures, i.e. the enclosure disclosed in these patents are stationary structures, and these devices are not suitable or adapted for providing an isolated workplace for removal of asbestos from ceilings of buildings. Thus, these systems are of no use when it is required to clean large contaminated areas due to the necessity of having to transport the hazardous materials from a remote region of the isolation enclosure by way of an unprotected and exposed route.

SUMMARY OF THE INVENTION

No portable isolation enclosure has previously been available for cleaning large contaminated ceiling areas, particularly for safely removing asbestos ceiling tile or asbestos-containing ceiling coatings. There is a great need for a sealed portable isolation enclosure for removing asbestos ceiling tile and other asbestos material from ceilings which includes a region for housing a worker and his tools and a worker-protection system therein, and having the capability of accommodating all the necessary filtering and ventilation systems therefor. Furthermore, such a portable isolation enclosure needs to have an adjustable ceiling-contacting plenum so as to accommodate ceilings of various heights. It is an object of the invention to provide such an apparatus.

Accordingly, it is also an object of the present invention to eliminate the deficiencies of the prior art, such as those set forth above.

It is another object of the invention to improve the safety and efficiency of asbestos removal from ceilings.

It is a further object of the present invention to provide an improved apparatus for safely removing asbestos ceiling tile or other asbestos containing materials from structures, without contaminating the ambient environment.

It is yet another object of the present invention to provide a sealed portable isolation enclosure within which a worker may remove asbestos material from ceilings or the like or asbestos ceiling tiles, which enclosure includes a region large enough to position an active worker therein.

It is still another object of the present invention to provide a portable isolation enclosure for removing asbestos ceiling material and tiles which is equipped with a worker-protection system therein.

It is yet a further object of the present invention to provide an adjustable plenum for use with a portable isolation enclosure so that the plenum may be adjusted to accommodate ceilings of various heights.

It is still a further object of the present invention to provide a portable isolation enclosure having a trap door for disposing of contaminated or hazardous materials.

It is another object of the present invention to provide a portable isolation enclosure equipped with air ventilation and filtering systems.

It is still another object of the present invention to provide a portable isolation enclosure for removing asbestos ceiling materials and tiles, which is safe, substantially pollution-free, and easily manufactured and assembled.

Still other objects, features and attendant advantages of the present invention will become apparent to those skilled in the art from a consideration of the following detailed description of embodiments constructed in accordance therewith, taken in conjunction with the accompanying drawings, wherein:

DESCRIPTION OF PREFERRED EMBODIMENT

Figure 1:
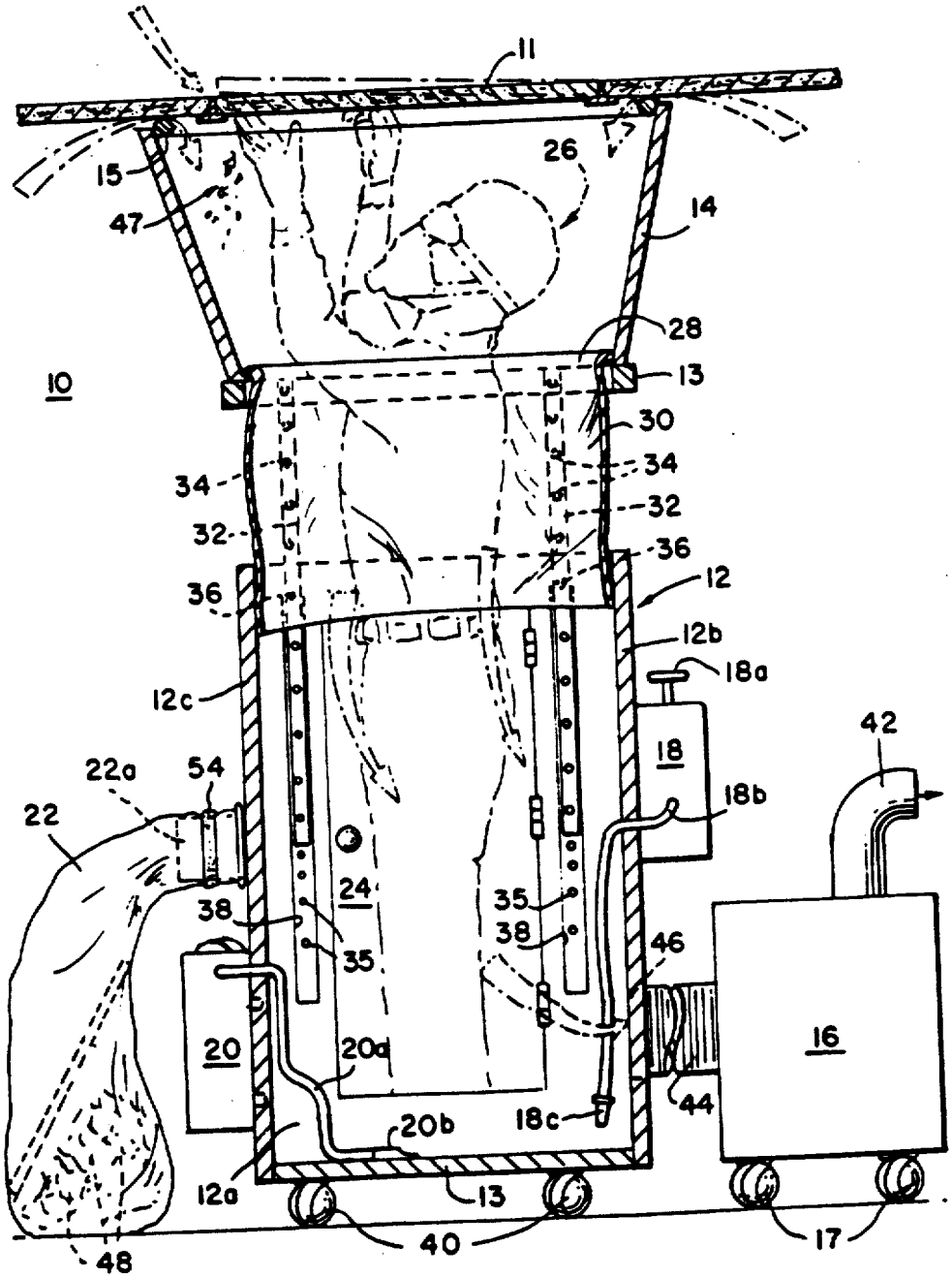
FIG. 1 is a partially schematic elevational view in cross-section of a portable isolation enclosure of the present invention, the arrows generally indicating the direction of air flow.

Presently preferred embodiments of the present invention are illustrated in FIG. 1 of the drawings, wherein an environmentally sealed and portable isolation enclosure 10 comprises the combination of an open top booth 12, an adjustable ceiling-contacting plenum 14, a high-efficiency particulate air (HEPA) filter vacuum system 16 capable of strong suction, e.g. 1000–1500 CFM, a secondary vacuum system 20, a shower unit 18, and a contaminated material disposal system 22.

The open top booth 12 is desirably of rectangular configuration and includes a bottom or floor wall 13 and four vertically extending walls including walls 12a, 12b and 12c which are substantially positioned and secured perpendicular to the floor wall 13, the secured edges of the walls being sealed to provide an enclosure which, except for the top and outlets, is air tight so as to prevent the passage of air and particulates therethrough. The booth 12 is preferably formed of metallic materials, such as lightweight aluminum or other alloys which possess lightweight and sturdy properties, although other suitable materials, such as rigid plastic materials, or even wood or fiberboard or the like, may also be employed.

Wall 12a of the booth 12 is provided with an air-tight door 24 which permits a worker 26 access to the interior of the booth 12. The bottom wall 13 includes on its bottom surface a plurality of castor wheels 40,40 for allowing the booth 12 to easily move from one location to another. It should be understood that while the illustrated booth 12 is manually pushed from one location to another, a motor (not shown) may be provided in conjunction with suitable wheels and a steering system (not shown) to provide a self-propelled unit, e.g. one which is movable while the worker is within the booth.

The open top region of the booth 12 is provided with an adjustable ceiling-contacting plenum 14 for generally enclosing the space between the booth and a ceiling tile 11. The plenum 14 is essentially of an inverted truncated pyramidal configuration, and includes a bottom end having a rectangular perimeter substantially equal to the perimeter of the booth 12, and a top end having a rectangular perimeter substantially greater than the booth perimeter, the greater perimeter of the top end serving to expose a large area of the ceiling 11 to a worker within the booth 12. The plenum 14 is also desirably formed of a metallic material, such as a lightweight aluminum or other lightweight alloys which are of adequate strength and resistance.

The plenum 14 is also preferably formed of four separate wall panels desirably connected along their edges so that the plenum can be collapsed or adjusted to a smaller size for movement of the enclosure 10 through narrow doorways. Also, or alternatively, the plenum 14 may be made easily removable from the booth 12 for the same purpose. In either case the plenum walls are desirably supported on a rectangular frame 13. An optional gasket or seal 15 may be provided at the upper end of the plenum for better control of air flow as described below.

The plenum 14 is vertically adjustably mounted to booth wall 12a and an opposing wall (not shown) through at least two spaced-apart and parallel supporting bars 32,32 which extend between the bottom end of the plenum, where they may be mounted on the frame 13, and below the top open end of the booth. The bars 32,32 are received within guide recesses 38,38, e.g. in the form of slots or grooves, formed within the wall 12a, which are also parallel and spaced-apart so as to correspond to the distance between the bars 32,32. The recesses or guides 38,38 permit the bars to easily slide vertically therein so that the plenum 14 can be raised or lowered relative to the booth 12.

Each bar 32 is provided with a plurality of spaced-apart vertically arranged apertures 34. Likewise, recesses 38,38 are also provided with a plurality of spaced-apart vertically arranged apertures 35, which are generally spaced vertically so as to correspond with the spacing of the apertures 34 in the bars 32,32, the apertures 34,35 being primarily suited for the reception or lodgement therein and therethrough of locking pegs 36,36 after the alignment of the apertures in the bars with the apertures in the guide recesses. This arrangement provides a locking means for locking the bars 32,32 and the plenum 14 at various predetermined heights. It should be understood as noted above that the plenum 14 may be totally removed from the booth 12, particularly when maneuvering the booth through doorways and the like, by simply removing the pegs and sliding out the bars from their corresponding recesses. Regardless, the plenum 14 can be raised to contact ceilings of various heights so as to prevent the escape of asbestos dust as a worker scrapes or removes asbestos material from the ceiling.

Disposed between the plenum 14 and the top open end of the booth 12 is a flexible plastic film 30 for substantially isolating the space between the plenum and the booth, particularly when the plenum 14 is raised substantially above the booth. The top end of the film 30 is securely connected to the plenum 14 by means of a hanger seal 28 mounted on the lower end of the plenum, the film 30 merely hanging downwardly. In other words, the film 30 freely hangs from plenum to the interior of the booth regardless of the position of the plenum relative to the booth, and it is unnecessary to secure the lower end of the film 30 to the walls of the booth 12. The film 30 is desirably a disposable transparent flexible plastic material so as to permit a worker within the booth to view the ambient surroundings, although an impervious curtain can alternatively be used. Regardless, the curtain, be it plastic film or impervious fabric, effectively seals the area between the plenum and the booth from the ambient environment.

The hanger seal 28 may merely be a rectangular hanger formed of rigid supporting material and sealed to the interior of the plenum 14 in such a way as to prevent leakage between the hanger seal 28 and the interior of the plenum 14. In place of the curtain 30 there can be used any other type of telescoping construction, e.g. wherein the walls are rigid such as aluminum, fiberglass or transparent plastic.

The booth 12 is provided with a portable HEPA filter vacuum system 16 which is connected to the booth at an opening 46 provided in wall 12b, via an air tight air intake hose 44. The HEPA filter vacuum system 16 includes wheels, e.g. castor wheels 17,17, for portability, as well as an outlet conduit 42. The HEPA filter vacuum system 16 generally includes a disposable filter bag, a prefilter and a HEPA filter for properly cleaning the asbestos-containing air introduced within the booth 12 and finally exhausted as clean air through the outlet conduit 42 to the atmosphere. The HEPA filter vacuum device 16 is provided to ventilate air through the booth and filter air directed to the atmosphere and/or ambient environment. The HEPA system operates continuously during use of the apparatus to draw air into the booth from the top of the plenum 14, especially after removal of the first ceiling tile 11 and even upon its movement to the position shown in phantom in FIG. 1, the air flow being generally in the directions shown by the arrows. Hence, the entire enclosure is always ventilated and air filtered, and the device allows air introduced to the enclosure 10 to exhaust only through the HEPA system 16. Scraps of asbestos and asbestos dust 47 fall to the bottom of the booth 12 or are entrained in the air flow and filtered out by the HEPA unit 16.

Figure 2:
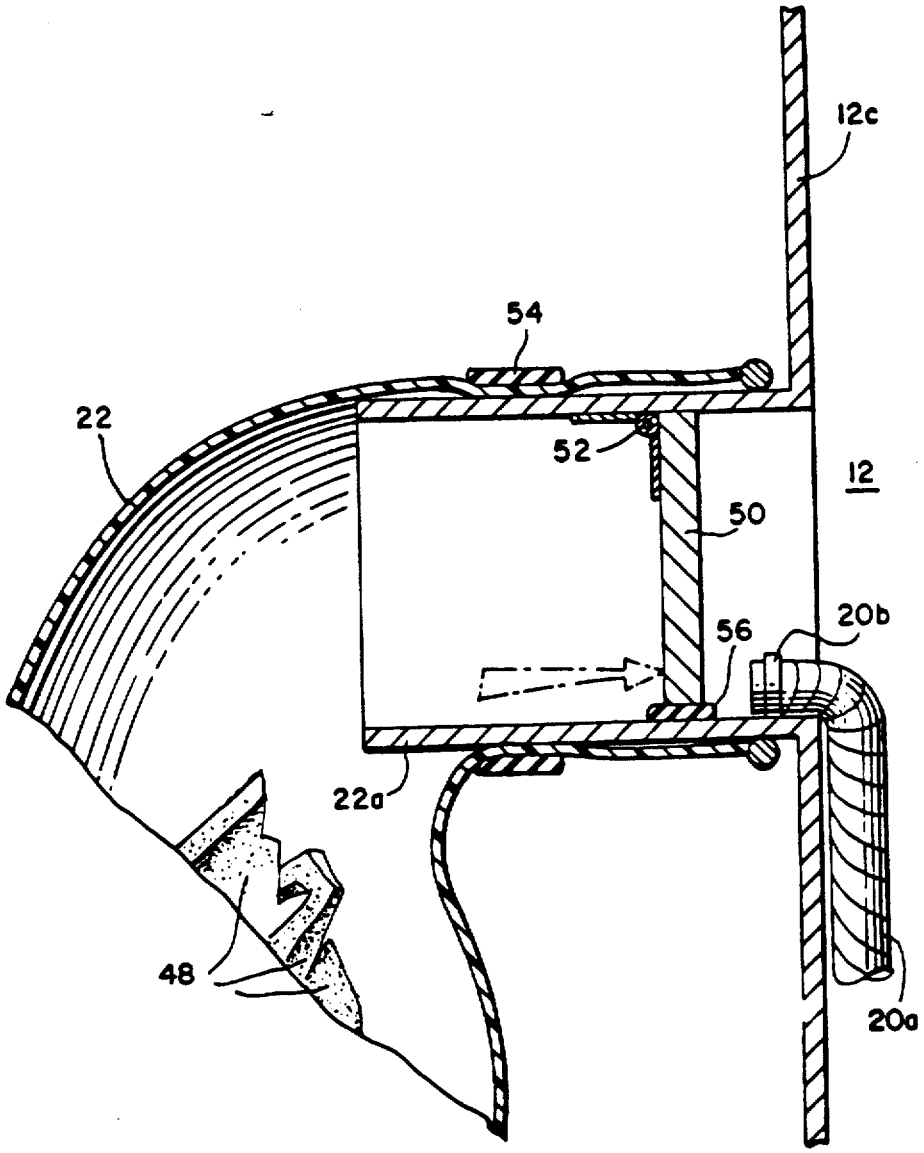
FIG. 2 is a cross-sectional view of the contaminated material disposal system employed in the present invention, the arrow indicating the force of atmospheric pressure.

Referring now to FIG. 2, a contaminated material disposal system is provided for disposing of the materials removed from the ceiling. The disposal system, generally structured with the wall 12a, includes a chute 22a in direct communication with the booth 12, a normally closed trap door 50 pivoted about a hinge 52 connected between the door 50 and chute 22a, and a disposable impervious flexible bag 22 for the disposal of hazardous materials 48 introduced therein. The hinge 52 is so placed that the door 50 opens only outwardly from the booth 12, and ambient atmospheric pressure outside the booth keeps the door closed unless it is forced open by the worker.

The mouth of the flexible disposal bag is secured by a band 54 which may be elastic so as to provide an air tight connection between the mouth of the bag about the chute 22a. In place of the band 54, the bag mouth can itself be provided with closure means, e.g. elastic material formed integrally with the mouth of the bag. Chute 22a generally extends normal to booth wall 12a, the trap door 50 disposed therein being positioned normal to the chute 22a and parallel to wall 12a. The perimeter of the trap door 50 may include an elastomeric seal 56 so as to achieve an air tight seal about the perimeter of the trap door 50. In use, the worker removes asbestos from above and deposits the chunks 48 thereof through the chute 22a and into the bag 22.

In addition, a shower unit 18 may be provided to wash and decontaminate a worker and the internal regions of the booth 12 after completion of a given stage of the asbestos removal operation. The shower 18 can be easily mounted to booth wall 12b through the use of bolts or screws, and includes a valve 18a and a flexible hose 18b extending between the shower reservoir and the interior of the booth through the wall 12b. The hose 18b includes a nozzle 18c which permits a worker to regulate the flow of fluid therethrough. While the reservoir 18 and valve 18a are shown as mounted on the exterior of wall 12b, it will be understood that they can alternatively be mounted within the booth 12.

A secondary vacuum system 20 (see FIG. 1), preferably a wet vacuum, is also provided as part of the apparatus. The secondary vacuum 20 has a hose 20a which is terminated with a vacuum nozzle 20b. The secondary vacuum system 20 facilitates the removal of asbestos dust which might remain in the booth 12 after completion of a phase of the asbestos removal from the ceiling, and particularly dust which may reside in the mouth of the chute 22a left after introduction of materials through the trap door 50. The secondary vacuum unit 20 is also used to vacuum asbestos dust, fibers and larger particles which have fallen to the floor, and also to vacuum dust from the worker's protective clothing before the worker leaves the booth.

In operation, the portable isolation enclosure of the present invention is wheeled to a predetermined site for the removal of asbestos-containing ceiling tile or the like. A worker, equipped with protective apparel, enters the booth 12 through the door 24 provided in wall 12a and closes the door. The worker then raises the plenum 14 to a height wherein the plenum upper end contacts the ceiling directly above the booth, and locks same via bars 32,32 and locking pegs 36,36. The HEPA filter vacuum system 15 is then turned on by the worker via a switch within the booth (not shown) or by an assistant outside to commence the ventilation and filtering of air drawn downwardly through the plenum and the booth. As the worker either removes the tile completely or the asbestos coated on the ceiling and places the chunks in the bag 22, the particles and dust therefrom are directed to the opening 46 of the HEPA vacuum unit 16. Large pieces of the tile are disposed in the disposal bag 22 through the trap door 50 of the chute 22a. After completion of the removal of the asbestos tile, the worker will wash himself and the internal regions of the booth with the use of the shower system 18. The residue is wet or dry vacuumed by means of the secondary vacuum unit 20. The operation is repeated until all the ceiling tile within a room is removed by simply pushing the booth 12 and HEPA unit 16 to predesired locations within the room.

It will be obvious to those skilled in the art that various other changes and modifications may be made without departing from the scope of the invention and the invention is not to be considered limited to what is shown in the drawings and described in the specifications.

What is claimed is:

1. A portable isolation enclosure, primarily useful for cleaning contaminated environments, particularly for removing ceiling tile or other asbestos-containing elevated structures, comprising:

an open top booth having a bottom wall and at least one vertically extending side wall to form a closed walled structure sufficiently large to comfortably enclose a worker;

a height adjustable and open top ceiling-contacting plenum above and in open communication with said open top booth and vertically slidably connected thereto;

plenum position locking means, integral with said booth, for locking said plenum at various predetermined elevations relative to said booth;

telescoping means for enclosing and sealing a space formed between said plenum and said booth regardless of the elevation of said plenum relative to said booth;

a waste disposal means for discharging asbestos from said booth, said waste disposal means being in communication with said side wall;

a first vacuum filtering means for continuously evacuating the interior of said booth, for filtering asbestos particles [form] *from* the atmosphere within said booth, and for discharging clean air to the exterior of said booth; and a second vacuum and filtering means having a movable nozzle for vacuuming the interior of said booth including said bottom wall, the area adjacent said waste disposal means and a worker within said booth.

2. A portable isolation enclosure in accordance with claim 1, further including shower means for washing the interior of said booth and a worker therein, said shower having a water discharge nozzle within said booth.

3. A portable isolation enclosure in accordance with claim 2, wherein said shower system includes a flexible hose and a valve to regulate the flow of water therethrough.

4. A portable isolation enclosure in accordance with claim 1, further comprising a plurality of castor wheels beneath said bottom wall.

5. A portable isolation enclosure in accordance with claim 1, wherein said first vacuum and filtering means is supported by a plurality of castor wheels.

6. A portable isolation enclosure in accordance with claim 1, wherein said first vacuum and filtering means comprises a high efficiency particulate air system.

7. A portable isolation enclosure in accordance with claim 1, wherein said height adjustable ceiling-contacting plenum includes a plurality of upwardly and outwardly diverging walls whereby the top of said plenum has a perimeter substantially larger than the perimeter of the bottom thereof.

8. A portable isolation enclosure in accordance with claim 7, wherein said bottom end of said telescoping means comprises a flexible impervious curtain having an upper edge supported by said plenum.

9. A portable isolation enclosure in accordance with claim 1, wherein said contaminated waste disposal means includes a chute, a normally closed trap door within said chute, and a flexible disposal bag having an opening secured about said chute.

10. A portable isolation enclosure in accordance with claim 9, wherein said trap door is hinged to said chute so as to open outwardly from said booth, whereby atmospheric pressure outside said booth biases said trap door closed.

11. A portable isolation enclosure in accordance with claim 10, wherein said trap door includes a seal about its periphery.

12. A portable isolation enclosure in accordance with claim 9, wherein said chute is integrally formed in said side wall of said booth.

13. A portable isolation enclosure in accordance with claim 1, wherein said plenum position locking means comprises a plurality of vertically extending spaced apart parallel bars connected between said booth and said plenum, said bars being received in corresponding spaced-apart parallel guide recesses in said at least one vertically extending side wall, said recesses and said bars having a plurality of spaced apart vertically arranged apertures therethrough for receiving locking pegs when the apertures in said bars are aligned with the apertures in said guide recess.

14. A portable isolation enclosure in accordance with claim 1, wherein a portion of said side wall is provided with an air tight door for permitting a worker access to the interior of said booth.

15. A portable isolation enclosure in accordance with claim 1, wherein said booth is substantially rectangular comprising four vertically extending side walls.

16. A portable isolation enclosure in accordance with claim 1, wherein said telescoping means is formed of a transparent material.

17. A portable isolation enclosure in accordance with claim 16, wherein said telescoping means comprises a flexible plastic film having an upper edge supported by said plenum.

18. A portable isolation enclosure in accordance with claim 1, further comprising a gasket at and surrounding the top of said plenum.

19. A portable isolation enclosure in accordance with claim 1, wherein said first vacuum and filtering means is capable of drawing 1000 to 1500 cubic feet of air per minute.

20. A portable isolation enclosure in accordance with claim 1, wherein said plenum is foldable and/or removable.

*21. A portable isolation enclosure, useful for cleaning contaminated environments, comprising:*

*an open booth having a bottom wall and at least one vertically extending side wall to form a closed walled structure sufficiently large to comfortably enclose a worker;*

*a height adjustable and open top ceiling-contacting plenum above and in open communication with said open top booth, said plenum being connected to said top booth for vertical movement with respect thereto;*

*plenum position locking means, integral with said booth, for locking said plenum at various predetermined elevations relative to said booth;*

*telescoping means for enclosing and sealing a space formed between said plenum and said booth regardless of the elevation of said plenum relative to said booth;*

*a waste disposal means for discharging waste from said booth, said waste disposal means being in communication with said side wall; and*

*a vacuum and filtering means for continuously evacuating the interior of said booth, for filtering waste particles from the atmosphere within said booth, and for discharging clean air to the exterior of said booth.*

*22. A portable isolation enclosure in accordance with claim 21, further including shower means for washing the*

*interior of said booth and a worker therein, said shower having a water discharge nozzle within said booth.*

*23. A portable isolation enclosure in accordance with claim 22, wherein said shower system includes a flexible hose and a valve to regulate the flow of water therethrough.*

*24. A portable isolation enclosure in accordance with claim 21, further comprising a plurality of castor wheels beneath said bottom wall.*

*25. A portable isolation enclosure in accordance with claim 21, wherein said vacuum and filtering means is supported by a plurality of castor wheels.*

*26. A portable isolation enclosure in accordance with claim 21, wherein said vacuum and filtering means comprises a high efficiency particulate air system.*

*27. A portable isolation enclosure in accordance with claim 21, wherein said height adjustable ceiling-contacting plenum includes a plurality of upwardly and outwardly diverging walls whereby the top of said plenum has a perimeter substantially larger than the perimeter of the bottom thereof.*

*28. A portable isolation enclosure in accordance with claim 27, wherein said bottom end of said telescoping means comprises a flexible impervious curtain having an upper edge supported by said plenum.*

*29. A portable isolation enclosure in accordance with claim 21, wherein said contaminated waste disposal means includes a chute, a normally closed trap door within said chute, and a flexible disposal bag having an opening secured about said chute.*

*30. A portable isolation enclosure in accordance with claim 29, wherein said trap door is hinged to said chute so as to open outwardly from said booth, whereby atmospheric pressure outside said booth biases said trap door closed.*

*31. A portable isolation enclosure in accordance with claim 21, wherein said plenum position locking means comprises a plurality of vertically extending spaced apart parallel bars connected between said booth and said plenum, said bars being received in corresponding spaced-apart parallel guide recesses in said at least one vertically extending side wall, said recesses and said bars having a plurality of spaced apart vertically arranged apertures therethrough for receiving locking pegs when the apertures in said bars are aligned with the apertures in said guide recess.*

*32. A portable isolation enclosure in accordance with claim 21, wherein a portion of said side wall is provided with an air tight door for permitting a worker access to the interior of said booth.*

*33. A portable isolation enclosure in accordance with claim 21, wherein said booth is substantially rectangular comprising four vertically extending side walls.*

*34. A portable isolation enclosure, primarily useful for cleaning contaminated environments, particularly for removing ceiling tile or other asbestos-containing elevated structures, comprising:*

*an open top booth having a bottom wall and at least one vertically extending side wall to form a closed walled structure sufficiently large to comfortably enclose a worker;*

*a height adjustable and open top ceiling-contacting plenum above and in open communication with said open top booth and vertically slidably connected thereto;*

*plenum position locking means, integral with said booth, for locking said plenum at various predetermined elevations relative to said booth;*

*telescoping means for enclosing and sealing a space formed between said plenum and said booth regardless of the elevation of said plenum relative to said booth;*

*a waste disposal means for discharging asbestos from said booth, said waste disposal means being in communication with said side wall; and*

*a vacuum and filtering means for continuously evacuating the interior of said booth, for filtering asbestos particles from the atmosphere within said booth, and for discharging clean air to the exterior of said booth.*

* * * * *